United States Patent
Pamer et al.

(10) Patent No.: US 8,888,429 B2
(45) Date of Patent: Nov. 18, 2014

(54) NUT WITH LUG FLARE

(75) Inventors: W. Richard Pamer, Macedonia, OH (US); Douglas P. Dennis, Guelph (CA)

(73) Assignee: JPMorgan Chase Bank, N.A., Cleveland, OH (US)

( * ) Notice: Subject to any disclaimer, the term of this patent is extended or adjusted under 35 U.S.C. 154(b) by 80 days.

(21) Appl. No.: 13/503,705

(22) PCT Filed: Dec. 22, 2009

(86) PCT No.: PCT/US2009/069202
§ 371 (c)(1),
(2), (4) Date: Apr. 24, 2012

(87) PCT Pub. No.: WO2011/078852
PCT Pub. Date: Jun. 30, 2011

(65) Prior Publication Data
US 2012/0219377 A1    Aug. 30, 2012

(51) Int. Cl.
*F16B 37/06*    (2006.01)
*F16B 39/282*    (2006.01)

(52) U.S. Cl.
CPC ............. *F16B 39/282* (2013.01); *F16B 37/068* (2013.01); *F16B 37/065* (2013.01)
USPC .......................................... 411/181; 411/188

(58) Field of Classification Search
USPC ..................... 411/179–181, 187, 188, 471
See application file for complete search history.

(56) References Cited

U.S. PATENT DOCUMENTS

| | | | |
|---|---|---|---|
| 2,486,769 A * | 11/1949 | Watson, Jr. .................... | 411/180 |
| 3,053,300 A | 6/1957 | Quinto | |
| 3,078,900 A * | 2/1963 | Walker .......................... | 411/181 |
| 3,878,599 A | 4/1975 | Ladouceur et al. | |
| 4,289,181 A | 9/1981 | Capuano | |
| 4,380,414 A * | 4/1983 | Capuano ........................ | 411/187 |
| 4,690,599 A | 9/1987 | Shinjo | |
| 4,741,654 A * | 5/1988 | Lovisek ........................ | 411/186 |
| 4,808,050 A | 2/1989 | Landt | |
| 5,340,251 A | 8/1994 | Takahashi et al. | |

(Continued)

FOREIGN PATENT DOCUMENTS

| | | |
|---|---|---|
| JP | S55-135219 | 10/1980 |
| JP | 64-058807 | 3/1989 |
| JP | 2009530571 | 8/2009 |

OTHER PUBLICATIONS

International Search Report and Written Opinion dated Mar. 1, 2010 of corresponding PCT Application No. PCT/US2009/069202, filed Dec. 22, 2009.

*Primary Examiner* — Flemming Saether
(74) *Attorney, Agent, or Firm* — Pearne & Gordon LLP (57) ABSTRACT

A clinch nut for attachment to a plastically deformable metal substrate is provided. The clinch nut comprises a body portion with a central axis and a punch portion extending from the body portion and coaxial with the central axis. The body portion includes an annular-shaped surface encircling the central punch portion. The annular-shaped surface includes a plurality of spaced apart lugs encircling the central punch portion. The plurality of lugs each includes a contact surface with a recessed portion where the contact surface engages the metal substrate. A first portion of the contact surface is biased outwards from the central axis upon insertion in the metal substrate to form at least one lug flare during attachment of the nut to the metal substrate. A portion of the metal substrate is entrapped between the at least one lug flare and the body portion.

10 Claims, 5 Drawing Sheets

(56) References Cited

U.S. PATENT DOCUMENTS

| | | | |
|---|---|---|---|
| 6,318,940 B1 * | 11/2001 | Mitts | 411/188 |
| 6,409,444 B2 * | 6/2002 | Pamer et al. | 411/180 |
| 7,156,598 B2 | 1/2007 | Tibbenham et al. | |
| 7,740,436 B2 | 6/2010 | Pamer | |
| 8,062,141 B2 | 11/2011 | Pamer | |
| 2007/0224017 A1 | 9/2007 | Pamer | |
| 2007/0297870 A1 | 12/2007 | Vrana et al. | |
| 2010/0227700 A1 | 9/2010 | Pamer | |

* cited by examiner

NUT WITH LUG FLARE

BACKGROUND OF THE INVENTION

1. Field of the Invention

The present invention generally relates to self-attaching fasteners and, more specifically to clinch nuts.

2. Description of the Related Art

Self-attaching fasteners are used in many industries such as, for example, the automotive and appliance industries to secure various components to metal panels. When clinch nuts are attached to the metal panels, screws or bolts are threaded into the clinch nuts and tightened to prescribed torque values. During installation, the clinch nuts must have sufficient rotational resistance to keep them from rotating relative to the metal panels when the screws are inserted and tightened. During service, the clinch nuts must have sufficient push-out resistance to keep them from pulling out of the metal panel when external forces such as, for example, vibration or other tensile forces are applied.

A clinch nut typically includes a central punch or pilot portion which at least partially extends into an opening in a metal plate or panel. When the clinch nut is self piercing, the central pilot portion cooperates with tooling to form the opening in the metal panel. The clinch nut is attached to the metal panel using a supporting die member which forms a mechanical interlock between the clinch nut and the metal panel. The die member typically deforms the metal panel into an annular groove extending around the clinch nut's pilot or punch portion and/or deforms the pilot or punch portion of the clinch nut over the metal panel to entrap the metal panel.

For example, U.S. Pat. No. 3,053,300 discloses a clinch nut having a central pilot portion which extends through a preformed opening in a metal panel and is folded over to stake the periphery of the opening. The deformation of the central pilot forces the metal panel to conform to an undulating surface of the annular groove and to form the interlock between the clinch nut and metal panel. While this clinch nut may have a relatively high push-out resistance, the deformation of the central pilot can easily distort the internal threads of the clinch nut.

One approach to eliminate distortion of the internal threads when deforming the pilot is to deform the metal panel to form the interlock rather than the pilot of the clinch nut. For example, U.S. Pat. Nos. 3,878,599 and 4,690,599 each disclose a clinch nut having an undercut on either the inner or outer wall of the groove. Material of the metal panel is forced into the undercut to improve the interlock formed between the clinch nut and the metal panel. With relatively thin metal panels, however, very little material is forced into the undercut, resulting in a relatively low push-out resistance.

One approach to increase the push-out resistance of clinch nuts of this type is to form a double-undercut groove. For example, U.S. Pat. No. 5,340,251 discloses a clinch nut having undercuts in both the inner and outer walls so that the annular groove is "dove-tail" shaped in cross section. The metal panel is forced into both of the undercuts to form an improved interlock between the clinch nut and metal panel. The deformation of the metal panel required to fill both undercuts, however, is difficult to obtain using conventional forming techniques, resulting in inconsistent push-out resistance.

An additional problem with the above-noted self-clinching fasteners is that they typically do not function well with thin metal panels. Accordingly, there is a need in the art for an improved clinch nut which can be reliably and consistently attached to a thin metal panel having sufficient push-out strength, sufficient rotational resistance, and without having distortion of the internal threads. Additionally, there is a need for an improved die member for installing a clinch nut in a thin metal panel having sufficient push-out strength, having sufficient rotational resistance, and without having distortion of the internal threads. Furthermore, there is a need for both the clinch nut and the die member to be relatively inexpensive to produce and relatively easy to use.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, a self-clinching nut for attachment to a plastically deformable metal substrate is provided. The self-clinching nut comprises a body portion with a central axis and a pilot or punch portion extending from the body portion and coaxial with the central axis. The body portion includes an annular-shaped surface encircling the central punch portion. The annular-shaped surface includes a plurality of spaced apart lugs encircling the central punch portion. One or more of the lugs includes a contact surface with a recessed portion where the contact surface engages the metal substrate. A first portion of the contact surface is biased in a rotational direction about the central axis upon insertion in the metal substrate to form at least one lug flare during attachment of the nut to the metal substrate. A portion of the metal substrate is entrapped between the at least one lug flare and the body portion.

In accordance with another aspect of the present invention, the contact surface may be formed of laterally spaced flat surface portions that intersect a central flat surface portion. The lateral flat surface portions are biased in opposed rotational directions about the axis as the lug engages the substrate to form the lug flares.

In accordance with another aspect of the present invention, the lug contact surface comprises a recess having a smooth concave shape. The lateral portions of the recess form lug flares upon attachment of the nut to the substrate.

BRIEF DESCRIPTION OF THE SEVERAL VIEWS OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Figure 1:
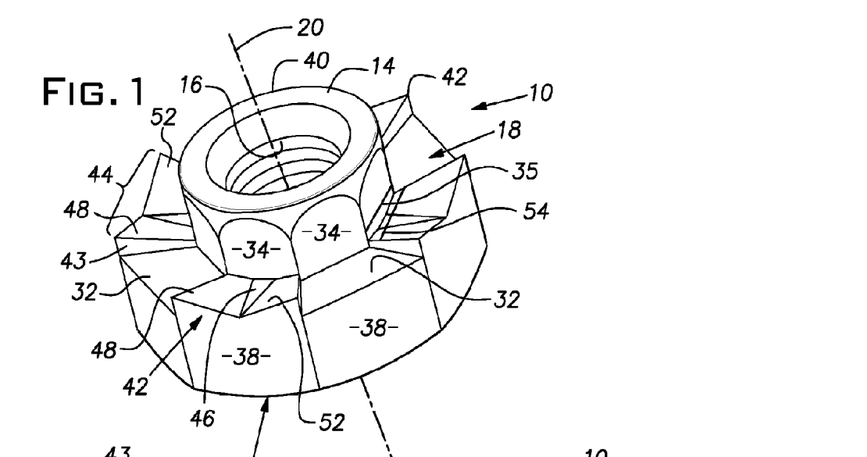
FIG. 1 is a perspective view of a clinch nut according to a first example.
Figures 2, 3:
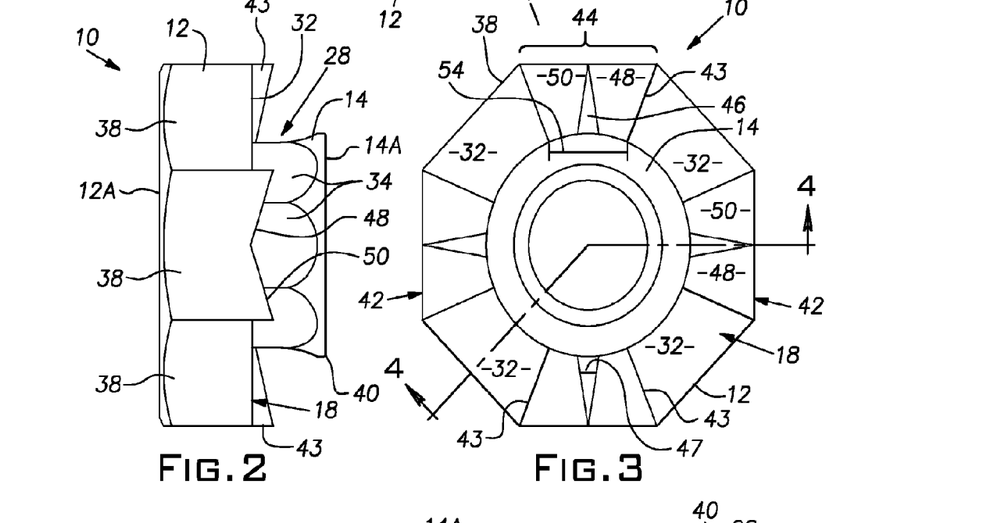
FIG. 2 is a side view of the clinch nut of FIG. 1.
FIG. 3 is a top view of the clinch nut of FIG. 1.

FIGS. 1-3 illustrate a self-piercing clinch nut 10 or fastener according to a first embodiment of the present invention for attachment to a plastically deformable metal plate or panel. It is noted that while the illustrated embodiment is a nut, other self-clinching fasteners such as, for example, self-clinching studs are within the scope of the present invention. The clinch nut 10 has a body portion 12 and a pilot or punch portion 14 extending from one end of the body portion 12, and a threaded hole or bore 16 axially extending through both the body portion 12 and the punch portion 14. The body portion 12 and the punch portion 14 can be coaxial with a central axis 20. Upon installation of the self-clinching nut 10 to a plastically deformable metal substrate, a threaded fastener can be inserted in the threaded bore 16.

Figure 4:
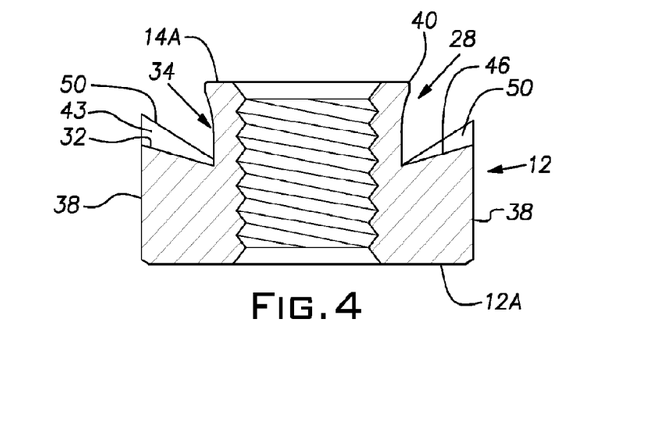
FIG. 4 is a sectional view taken along line 4-4 of FIG. 3.

Referring to FIGS. 2 and 4, the body portion 12 extends to a radial end surface 12a corresponding with one axial extremity of the nut 10. The punch portion 14 extends to a radial end surface 14a corresponding with the other axial extremity of the nut 10.

The punch portion 14 is generally smaller than the body portion 12, such that the body portion 12 includes a generally annular-shaped surface 18 encircling the central punch portion 14. The annular-shaped surface 18 is configured for engaging a metal panel, substrate or other element. The annular-shaped surface 18 can be relatively perpendicular to the central axis 20. The annular-shaped surface 18 of the body portion 12 includes a plurality of spaced apart lugs 42 encircling the central punch portion 14. The annular-shaped surface 18 can further include a plurality of first face portions 32 on the body portion 12 that can be located alternately in between the lugs 42. The first face portions 32 can be flat or can have a variety of inclined angles relative to the central axis 20. The first face portions 32 can help maximize the extent to which the work-piece cooperates with the clinch nut 10 to resist axial loads which tend to separate the two components. Each first face portion 32 can be polygon-shaped wherein it is formed by a plurality of angled or inclined, planer or flat faces. The polygonal-shape provides a non-uniform shape which constricts or coins the work-piece material during the clinch-nut setting process, thereby generating enhanced push-out resistance and torque-out resistance as described in more detail hereinafter. The bearing area is increased by increasing the number of the first face portions 32 (note the optimum bearing area is a cone) but this decreases the torsional resistance.

The punch portion 14 includes a punch outer periphery 28 that has a profile that is inwardly angled or inclined or tapered as shown in FIG. 2 to form an undercut in the punch portion 14. The punch outer periphery 28 can also be polygon-shaped where it is formed by a plurality of second face portions 34. The second face portions 34 can be angled or inclined, undulating, planar or flat. The punch outer periphery 28 can be formed by about 6 to about 10 of the second face portions 34, or formed by about 8 of the second face portions 34. As shown in FIG. 1, the punch outer periphery 28 can be formed by the same number of plurality of faces 34 that are circumferentially aligned with the first face portions 32 of the body portion 12. It is noted, however, that the outer periphery 28 of the punch portion 14 can have other configurations.

The outer or free end of the punch portion 14, which is opposite the body portion 12, has a piercing or shearing edge 40 formed thereon. The shearing edge 40 perforates or shears a metal plate or panel during installation of the clinch nut 10 in the metal panel. The length of the punch portion 14 can be sized to accommodate the work-piece material thickness. The diameter of the punch portion 14 can be sized to provide sufficient column strength to allow the clinch nut 10 to punch its own hole into materials up to 3 mm thick at a maximum hardness of 50 on the Rockwell C hardness scale (approximately 255,000 p.s.i. or 1700 mPa ultimate tensile strength of the work-piece material). For thinner and/or softer materials, these maximum values would be increased. For thicker materials and/or harder materials, the punch portion geometry can be sized to accommodate the requirements of those workpieces.

The body portion 12 can have an outer periphery which is polygonal-shaped wherein it is formed by a plurality of third face portions 38. The outer periphery can be formed by about 4 to about 12 third face portions 38, or about 8 third face portions 38, as shown in FIG. 3. As shown in FIG. 1, the outer periphery can be formed by the same number of third face portions 38 as the first face portions 32 and the second face portions 34. The third face portions 38 of the outer periphery of the body portion 12 can be circumferentially aligned with the first face portions 32 or the second face portions 34. It is noted, however, that the outer periphery of the body portion 12 can alternatively have other configurations such as, for example, cylindrical. The length of the body portion 12 is sized to provide sufficient thread engagement to consistently break (without stripping the threads) the mating externally threaded member whose material strength properties are matched to those of the clinch nut 10.

The plurality of lugs 42 on the annular-shaped surface 18 of the body portion 12 increases the torque or rotational resistance of the clinch nut 10. The lugs 42 can be raised lobes or protuberances which axially extend above the annular-shaped surface 18 of the body portion 12. The lugs 42 can circumferentially extend over a limited distance such that abutments 43 are formed by the difference in height between the lugs 42 and the first face portions 32. The abutments 43 impede or resist rotation of the clinch nut 10 relative to the metal substrate. The abutments 43 can be oriented perpendicular to the rotational motion of the fastener or the nut.

The upper side of each lug 42 includes a contact surface 44 that is configured to engage a metal substrate 60, as will be described with regard to FIGS. 5-7. The contact surface 44 can be generally perpendicular to the central axis 20. The lugs 42 are circumferentially spaced apart along the annular-shaped surface 18. The cross-sectional shape of the illustrated lugs 42 can be rectangular or any other suitable shape.

The contact surface 44 of the lugs 42 includes a recessed portion 46. The recessed portion 46 represents an area of the lug 42 that is shallower than surrounding portions of the lug 42. This enables the lug 42 to have an improved attachment to a substrate 60, as will be described. The contact surface 44 includes at least a first portion 48 that engages the metal substrate 60. In the example shown in FIG. 1 and FIG. 3, the contact surface 44 includes a first portion 48 and a second portion 50 that each engages the metal substrate 60. The first portion 48 and the second portion 50 can surround the recessed portion 46. The recessed portion 46 in this example can be one surface that has a geometric shape where the recessed portion 46 has an orientation angle relative to the central axis 20.

In the example of FIG. 1, the first portion 48 of the contact surface 44 and the second portion 50 of the contact surface 44 are sloped in opposite directions about the central axis 20. The two portions 48, 50 can be sloped downwardly towards the recessed portion 46. In the specific example shown in FIG. 3, the recessed portion 46 has a larger width 47 at a location radially closer to the punch portion 14 than at a location radially further away from the punch portion 14. The larger width will receive material from the substrate and will help to restrict removal of the nut from the substrate, due to the material interacting with the portions of the contact surface 44 that surround the recessed portion 46. In other examples, the recessed portion 46 can have a curvature, such as a dimple, in the surface. In another example, as will be described in FIG. 14, the recessed portion 46 is represented by a general curvature in the lug 42.

As shown in FIG. 3, the contact surface 44 of the lug 42 has a width 54 extending in the rotational direction about the central axis 20. The contact surface 44 has a generally trapezoidal periphery with an increasing width at radially outward locations. The width 54 of the lug 42 can be less than or equal to a width 35 of the second face portion 34 of the punch portion 14 at their juncture, as also shown in FIG. 1.

Referring to FIG. 4, the first face portion 32 and the recessed portion 46 are shown to be located at substantially the same axial distance from the body radial end surface 12a at corresponding radially outward locations from the central axis 20. However, the recessed portion 46 can have a plurality of orientation angles relative to the central axis 20. The recessed portion 46 can be located above or below the first face portion 32. In further examples, the recessed portion 46 can have an incline such that a part of the recessed portion 46 is located above the first face portion 32 and a part of the recessed portion 46 is located below the first face portion 32.

Figure 5:
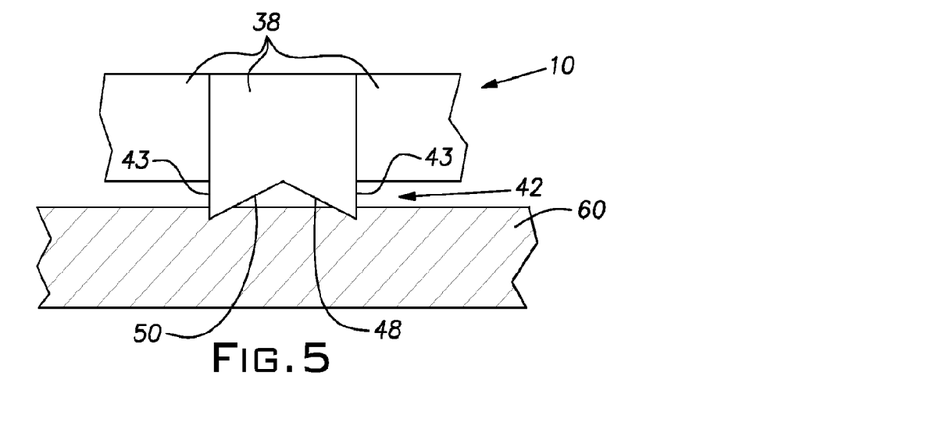
FIG. 5 is a partial sectional view of the clinch nut of FIG. 1 as it engages a metal substrate.
Figure 6:
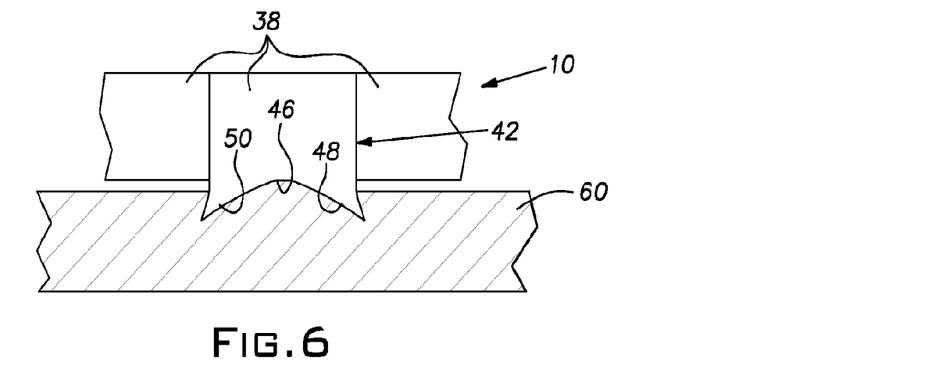
FIG. 6 is a partial sectional view of the clinch nut of FIG. 5 as it engages a metal substrate and is in a position closer to the metal substrate.
Figure 7:
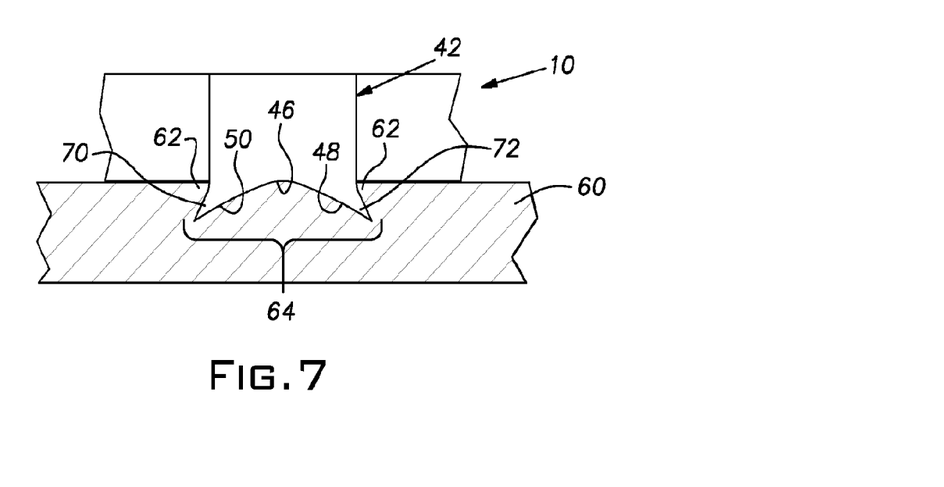
FIG. 7 is a partial sectional view of the clinch nut of FIG. 6 as it is in a final position and is secured to the metal substrate.

FIGS. 5-7 illustrate installation of the clinch nut 10 or the so-called "nut setting process", and specifically one lug 42, into a metal substrate 60. The clinch nut 10 is relatively moved toward the metal substrate 60 in an axial direction by any suitable manner. It is noted that the relative movement between the clinch nut 10 and the metal substrate 60 can be achieved by moving either one or both of the components.

The relative movement between the clinch nut 10 and the metal substrate 60 causes the shearing edge 40 to shear into the metal substrate 60, though the shearing edge 40 is not shown in this view. FIG. 5 shows the clinch nut 10 just as the lugs 42 begin to penetrate the metal substrate 60. FIG. 6 shows the clinch nut 10 as the lugs 42 substantially penetrate the metal substrate 60 with the first portion 48 and the second portion 50 of the contact surface 44 substantially engaging the metal substrate 60. At this time, the portions 48 and 50 begin to deflect and/or deform in opposite rotational directions about the central axis 20. FIG. 7 shows the clinch nut 10 in its final position, where it is secured to the metal substrate 60 and the lugs 42 are fully embedded in the substrate. As shown, the portions 48 and 50 are fully deflected and/or deformed to provide lug flares 70 and 72 as described below.

As described above, the contact surface 44 of each of the lugs 42 each includes a recessed portion 46. The recessed portion 46 at the center top portion of the lug 42 (as shown in FIGS. 5, 6 and 7) can cause the lateral sides of the lug 42, represented by the abutments 43, to flare outwardly to form a dovetail connection 64 with the substrate 60 when the clinch nut 10 reaches its final position of FIG. 7. The lug 42 includes abutment 43, as shown in FIGS. 1 and 5-7, which can form an effective wedge-shape or a triangular shape with the first portion 48 of the contact surface 44 and also with the second portion 50 of the contact surface 44. The orientation of the first portion 48 and the second portion 50 with respect to their associated abutments 43 causes a laterally outward force component to spread the abutments 43 of the lugs 42 apart to form the dovetail connection 64 with the material. Essentially, as the abutment 43 enters the material, material from the substrate enters the inner area bounded by the angled orientation of the first portion 48 and the second portion 50. As the clinch nut 10 is inserted further into the substrate, the material from the substrate in the inner area pushes outwardly against the first portion 48 and the second portion 50 as the material slides along the angled orientation of the first portion 48 and the second portion 50 to deform the abutments 43 laterally outwardly in opposite rotational directions about the axis 20. As the first portion 48 is biased outwards, the contact surface 44 forms a first lug flare 70 by the complete attachment of the clinch nut 10 to the metal substrate 60. The second portion 50 of the contact surface 44 forms a second lug flare 72 upon insertion in the substrate 60. A portion 62 of the metal substrate 60 is entrapped between each lug flare 70 and the body portion 12 of the clinch nut 10. The portion 62 of the material of the metal substrate 60 that is entrapped restricts removal of the clinch nut 10 away from the substrate 60. The entrapped portion 62 of the material improves the torque out as well as the push out of the clinch nut 10.

The recessed portion 46 can have different shapes and sizes to further increase the bias of the abutments 43 of the lug 42 to the outside, thus forming a more secure attachment of the clinch nut 10 with the substrate 60. Also, the recessed portion 46 of the lug 42 results in the lug 42 having a smaller engagement area that more easily penetrates the substrate 60 and can more accurately position the lugs 42 and the clinch nut 10.

As the clinch nut 10 is inserted further into the substrate 60, as shown by the comparison between FIG. 6 and FIG. 7, the first portion 48 of the contact surface 44 is biased in a lateral rotational direction about the central axis 20, which is to the left in this example view, to form the lug flare 70. In addition, in this example, the angled surface of the first portion 48 helps to increase the amount that the most distal end of the first portion 48 is deformed outwardly. Other orientations of the first portion 48 and the second portion 50 can also be provided so long as a portion of the lug 42 is biased outwardly.

The clinch nut 10 with the recessed portion 46 helps to create at least one lug flare 70 and to provide a higher force needed to push out the clinch nut 10. In the United States, a push out test is used to test the clinch nut 10. The clinch nut 10, such as a fastener, is axially forced out of the metal substrate 60 in a direction opposite to the direction of insertion. The set nut is axially pushed out of the substrate 60, from the punch side, in a direction opposite to the direction of insertion. In Europe, a pullout test is used to test clinch fasteners. In this test, the nut body is pulled away axially pulled in a direction opposite to the direction of insertion. For example, the sheet is clamped to a fixture, a screw is run down into the thread, and then the screw is pulled axially in a direction opposite to the direction of insertion. In Europe, there is also a "pull through" test used to test clinch fasteners. The nut is axially pulled through the material in the same direction in which it was inserted. In typical applications, the nut is threadedly engaged with something that is fixed or otherwise stationary and provides additional resistance to the pull through test load. By providing a recessed portion 46 in the lug 42, an increased force is needed to remove the clinch nut 10 due to the fact that additional material is received in the recessed portion 46 that helps to bias the abutments 43 outwardly. In addition, the material received in the recessed portion 46 restricts movement of the clinch nut 10. Thus, the recessed portion 46 provides an improved result for any of the United States or European tests for at least these reasons.

By spreading the lugs 42 and the lug flares 70, 72 around the rotational direction of the clinch nut 10, the resistance to torque out is increased in either a fastener tightening or fastener releasing movement of the clinch nut 10. Resistance to torque out in the direction which would disengage the clinch nut 10 with a connected part is valuable to maintain a connection during use with vibration and/or cyclic loading or the like. Also, during disassembly, corrosion may require increased disengaging rotational loads, and increased resistance to torque out of the nut maintains the nut engagement with the material. In addition, resistance to torque out in the direction that engages the connected part can have value during assembly if the screw has a locking feature that must be overcome. The resistance to torque out provided by the clinch nut 10 is also valuable if weld slag is present to cause unexpected resistance to engagement of the screw. Also, if there is an adhesive patch on the screw or paint builds up on the screw these conditions can also cause unexpected resistance to the engagement of the screw.

The additional gripping of the lug flare 70, 72, improves the push out performance of the clinch nut 10. Without the formation of lug flare 70, 72, the amount of a push out force is dependent upon how much material is trapped in the undercut portion at the base of the punch portion 14. The punch undercut and the lug flare 70, 72 provide a combined increased push out value. The increased combined punch undercut and lug flare gripping also assists or increases the torque out performance. The increased push out from the lug flare 70, 72 also increases the torque out since as the clinch nut 10 begins to lose grip and rotate, the lug rides up over the base material in a push out direction and acts as a plow due to its flared shape so as to increase the push out strength while at the same time enhancing the torque out.

Figure 8:
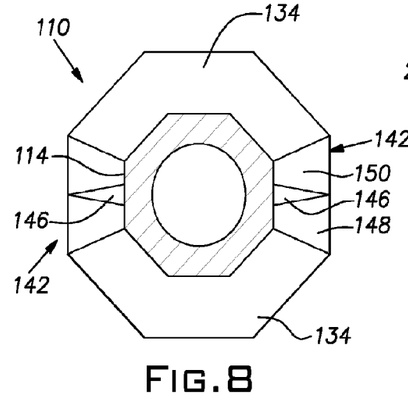
FIG. 8 is a top view of a clinch nut according to a second example.

FIG. 8 illustrates a self-piercing clinch nut 110 according to a second example wherein like reference numbers are utilized to indicate like structure. The clinch nut 110 in this example includes two lugs 142 diametrically disposed on opposite sides of the central punch portion 114. In FIG. 8, the lugs 142 are spaced apart by face portions 134 that encircle the central punch portion 114 between the lugs 142. Each of the portions 134 has a conical shape that is inclined downwardly toward the central punch portion 114. Of course, the face portions 134 may be formed of a plurality of smaller faceted portions similar to face portions 34. The portions 134 as shown in FIG. 8 cooperate to provide a bearing surface of relatively larger area as compared with the nut 10. In this example, each lug 142 includes a recessed portion 146, a first portion 148 of the contact surface and a second portion 150 of the contact surface. Increases in push-out and torque-out are achieved with increasing numbers of lugs and additional metal entrapped by the lug flares. Other sizes, dimensions, shapes, orientations, and number of lugs can also be used to completely surround the punch portion 114. Any of the other examples from any of the other figures can also include lugs completely encircling the punch portion.

Figure 9:
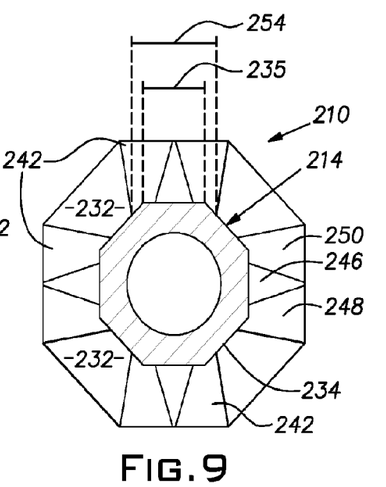
FIG. 9 is a top view of a clinch nut according to a third example.

FIG. 9 illustrates a self-piercing clinch nut 210 according to a third example wherein like reference numbers are utilized to indicate like structure. The clinch nut 210 in this example includes lugs 242 encircling the central punch portion 214 with first face portions 232 located in between the lugs 242. This example differs from FIG. 1 in that the lug 242 has a width 254 extending in the rotation direction about the central axis that is greater than a width 235 of the second face portion 234 of the punch portion 214. This configuration can help to further secure the clinch nut 210 to the substrate. In other examples, different dimensions for the lugs 242 can be used, different amounts of lugs 242 can be used to encircle the central punch portion 214, and the first face portions 232 can also be randomly dispersed or even not present in any of the examples. In this example, each lug 242 includes a recessed portion 246, a first portion 248 of the contact surface and a second portion 250 of the contact surface. Any of the other examples from any of the other figures can also include lugs that have a width that is greater than a width of the second face portion of the punch portion.

Figure 10:
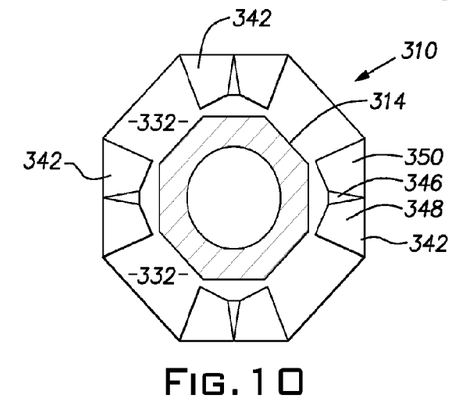
FIG. 10 is a top view of a clinch nut according to a fourth example.

FIG. 10 illustrates a self-piercing clinch nut 310 according to a fourth example wherein like reference numbers are utilized to indicate like structure. The clinch nut 310 in this example includes third example lugs 342 encircling the central punch portion 314 with at least one first face portion 332 located in between the lugs 342. This example differs from FIG. 1 in that the lug 342 is radially truncated and can be offset at a distance away from the punch portion 314. The first face portion 332 can be one continuous portion due to the face that the lug 342 is offset from the punch portion 314. In this example, each lug 342 includes a recessed portion 346, a first portion 348 of the contact surface and a second portion 350 of the contact surface. In other examples, different dimensions for the lugs 342 can be used, different amounts of lugs 342 can be used to encircle the central punch portion 314, and the first face portions 332 can also be randomly dispersed or even not present in any of the examples. Any of the other examples from any of the other figures can also include lugs that are radially truncated and that can be offset from the punch portion.

Figure 11:
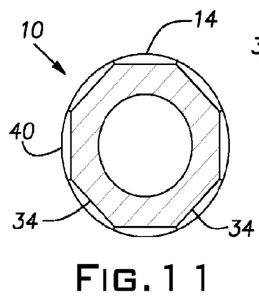
FIG. 11 is a top view of a punch portion of the clinch nut according to the first example.

FIG. 11 illustrates a cross-section of the punch portion 14 of the self-piercing clinch nut 10 according to the first example of FIG. 1. In this cross-section, the second face portions 34 of the punch portion 14 can be seen. In the first example of FIG. 1 and FIG. 11, there are eight second face portions 34 though other geometric shapes with varying amounts of second face portions 34 can be provided. FIG. 11 also shows how the second face portions 34 contribute to forming an undercut in the punch portion 14 due to the smaller radial dimensions of the second face portions 34 in comparison to the top portion of the punch portion 14. The diameter of the part of the punch portion 14 with the piercing or shearing edge 40 is larger than the diameter of the second face portions 34. Thus, as the clinch nut 10 is inserted into a substrate 60, the undercut helps to secure the clinch nut 10 in the substrate 60 by trapping a portion of the substrate 60 and restricting the removal of the clinch nut 10.

Figure 12:
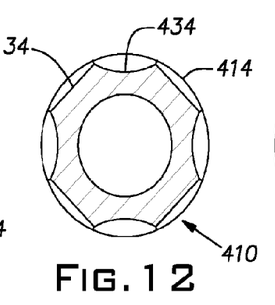
FIG. 12 is a top view of a punch portion of a clinch nut according to a fifth example.

FIG. 12 shows a fifth example clinch nut 410 wherein like reference numbers are utilized to indicate like structure. The clinch nut 410 in this example includes a punch portion 414 having at least one second face portion 434 that is scalloped-shaped in the form of an elongate concave recess. Furthermore, the clinch fastener 410 can include a plurality of second face portions 34, 434 along its outer surface that alternate between being scalloped-shaped and not scalloped-shaped. In further examples, the scalloped-shaped second face portions 434 can be randomly distributed along the outer periphery of the punch portion 414. Any of the other examples from any of the other figures can also include second face portions that are scalloped-shaped.

Figure 13:
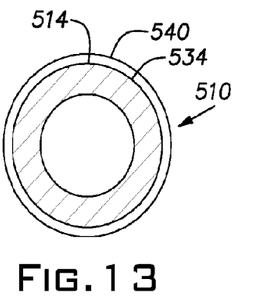
FIG. 13 is a top view of a punch portion of a clinch nut according to a sixth example.

FIG. 13 shows a sixth example clinch nut 510 wherein like reference numbers are utilized to indicate like structure. The clinch nut 510 in this example includes a punch portion 514 having one second face portion 534. This second face portion 534 is a cylindrical or circular surface, as opposed to a plurality of different surfaces. The second face portion 534 still has a smaller radial dimension than the piercing or shearing edge 540 to form the undercut. Any of the other examples from any of the other figures can also include a second face portion that is substantially circular.

Figure 14:
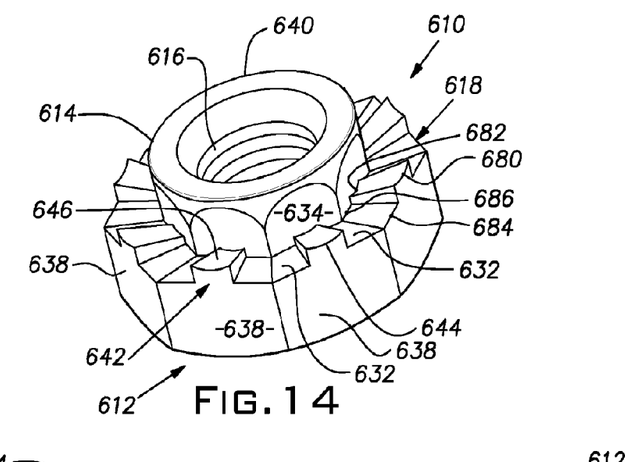
FIG. 14 is a perspective view of a clinch nut according to a seventh example.

FIG. 14 shows a seventh example clinch nut 610 wherein like reference numbers are utilized to indicate like structure. The clinch nut 610 in this example includes at least one contact surface 644 that is sloped downwardly from an outer location 680 to an inner location 682. In further examples, the annular-shaped surface 618 of the body portion 612 can include the first face portions 632 that are located in between the lugs 642. The first face portions 632 can also be sloped downwardly from an outer location 684 to an inner location 686. The sloped design allows a portion of the lug 642 to contact and become biased by the substrate before other portions of the lug 642 contact the substrate. Any of the other examples from any of the other figures can also include lugs that include an inclined surface.

The example of FIG. 14 also includes a plurality of lugs 642 that has a general or continuous curvature. In this example, geometric shapes do not bound a set area of the recessed portion, as shown in FIG. 1. Instead, the contact surface 644 of the lug 642 is generally concave and the shallowest portions define the recessed portion 646 of the lug 642. In further examples, the lug could have a portion of its contact surface be concave or a portion of the contact surface can have a dimple or a depression. Any of the other examples can also include recessed portions as shown in FIG. 14 or lugs having a curvature across its contact surface.

Figures 15, 16, 17:
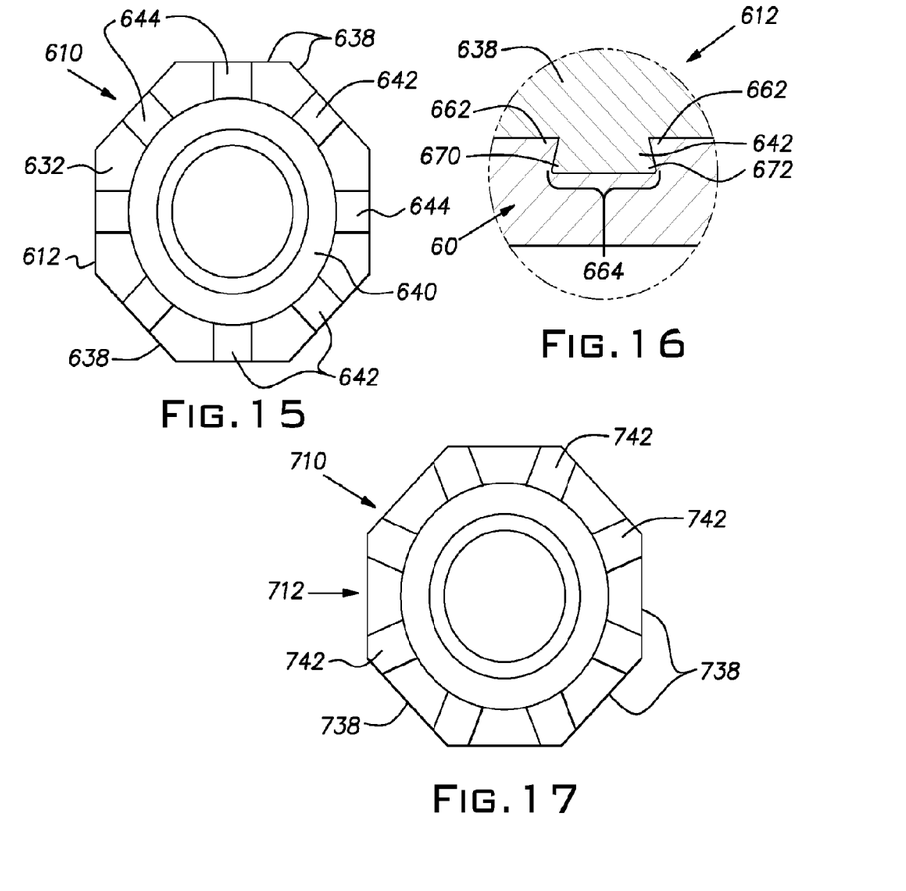
FIG. 15 is a top view of the clinch nut of FIG. 14.
FIG. 16 is a partial section view of an example engagement between a clinch nut of the first example and a metal substrate.
FIG. 17 is a top view of a punch portion of a clinch nut according to an eighth example.

FIG. 15 shows a top sectional view of the example of FIG. 14. In this example, the body portion 612 has an outer periphery that includes a plurality of third face portions 638. Each lug 642 can be located in phase about a corresponding third face portion 638, such as in an approximately central location on each of the third face portions 638. In addition, other examples can include the lugs 642 being located in any location about each third face portion 638.

FIG. 16 shows an example of the engagement of the lugs 642 with a substrate 60. This engagement of the lugs 642 can correspond to any of the previous examples. In this example, one of the lugs 642 includes at least two lug flares 670, 672 that are configured to form a dovetail connection 664 with the metal substrate 60. A portion of metal 662 is entrapped between the body portion 612 of the nut and each lug flare 670 and 672. The dovetail connection 664 is represented by the shape of the engagements between the lug flares 670, 672, the lug 642, and the substrate 60. Other shapes and dimensions can be used to form other shaped connections including other relatively dovetail-shaped connections. The dovetail connection 664 can also include various surfaces and depressions having various geometric shapes that can correspond to the recessed portion 646 of any of the lugs 642. In the resulting dovetail shape, the connection of the clinch nut in the substrate forms at least one lug flare that entraps metal between the lug flare and the body of the nut to provide additional resistance to push-out. In this manner, the lug flares increase the amount of metal entrapment and supplement the metal entrapment provided by the undercut central punch. It should be appreciated that the lug flare metal entrapment is provided at locations remote of the central punch and does not require further increases in punch undercut which may tend to reduce the punch column strength.

FIG. 17 shows an eighth example of the clinch nut 710. In this example, the body portion 712 has an outer periphery that includes a plurality of third face portions 738, at the corner of the face portions 738. Each lug 742 can be located out of phase such that each lug 742 is located about two different third face portions 738. In this example, each of the lugs 742 is located on about half of a third face portion 738 and on about half of another third face portion 738. In further examples, a majority of one lug 742 can be located on a third face portion 738 and a minority of a lug 742 can be located on a different third face portion 738. In still further examples, some of the lugs 742 can be located in phase and some of the lugs 742 can be located out of phase. Lugs from any of the other examples can also be located either in phase or out of phase.

Figures 18, 19:
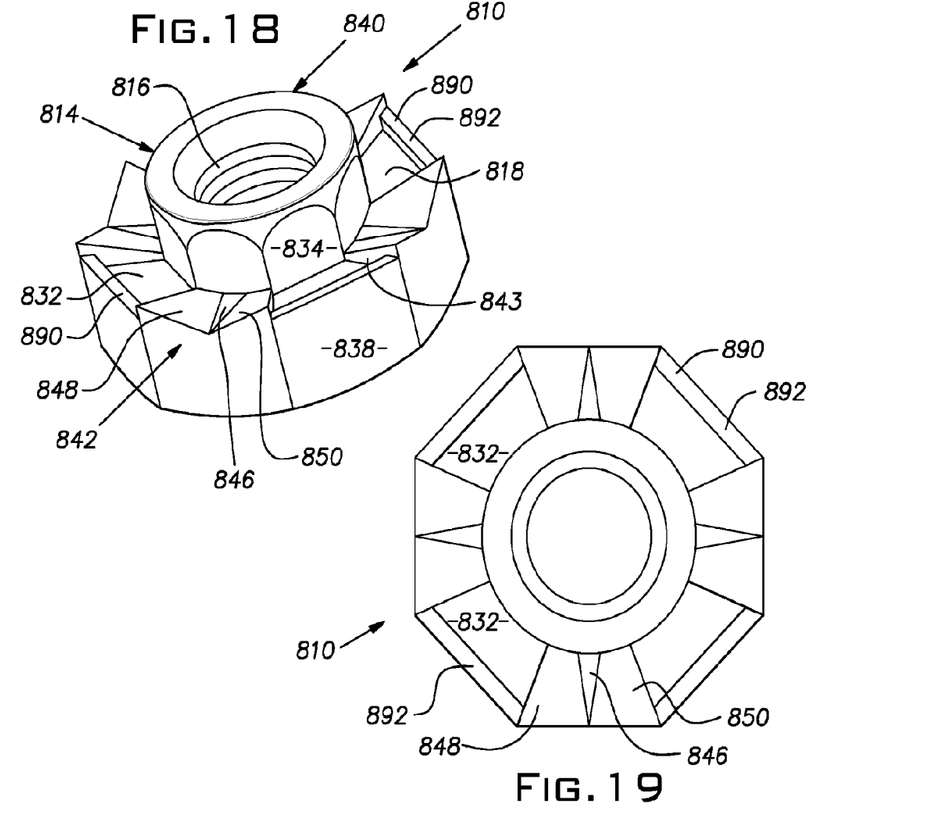
FIG. 18 is a perspective view of a clinch nut according to a ninth example.
FIG. 19 is a top view of the clinch nut of FIG. 18.

FIGS. 18 and 19 show a ninth example clinch nut 810 wherein like reference numbers are utilized to indicate like structure. The clinch nut 810 in this example includes a body portion 812 with an annular-shaped surface 818. The annular-shaped surface 818 includes a plurality of first face portions 832 that are located in between the plurality of the lugs 842. The plurality of first face portions 832 further includes an outer wall 890. The outer wall 890 includes a top surface 892 that is located at a height closer to a piercing edge 840 of the punch portion 814 than the location of the first face portions 832. The top surface 892 of the outer wall 890 can affect and alter the lug flare that is formed by the clinch nut 810.

Figure 20:
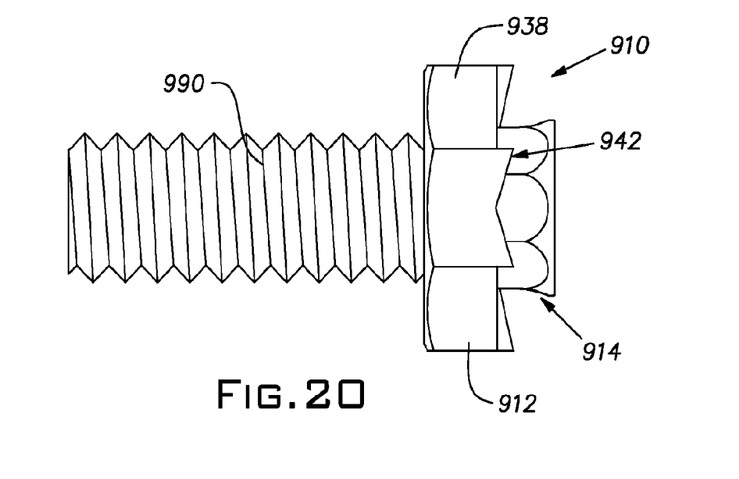
FIG. 20 is a side view of a stud including a clinch mounting portion in accordance with the invention.

FIG. 20 shows how any of the example clinch fasteners can described above can be incorporated into a stud 910. To that end, the stud 910 includes a body portion 912, a punch portion 914 and lugs 942 for engagement with a metal substrate or other elements as described above. The body portion 912, punch portion 914 and lugs 942 may be configured as described in any of the prior embodiments. The stud 912 includes a threaded shaft 990 instead of a threaded bores as in prior embodiments. As indicated, any of the examples from above (FIGS. 1-17) can also include a stud or a shaft that extend from the clinch fastener.

It is noted that any of the features shown in FIGS. 1-17 can be combined with any number of other features to form a clinch fastener. For example, any of the examples can include a variety of lugs, such as lugs 42, 142, 242, or 642 that include a recessed portion 46. The recessed portion 46 can be a geometric shape, an irregular shape, a dimple, or can be a curved surface that is located at a more shallow location than a contact surface 44 of the lug. Any number of lugs can be provided with or without the first face portions 32 on the body portion 12 being included in the clinch fastener in between the lugs. In addition, the lugs can have a variety of geometries and sizes, such as the lugs being in-phase or out of phase as shown in FIG. 15 and FIG. 17. In further examples, various second face portions 34, 434, 534 can be provided with different surfaces and shapes such as scalloped-shaped. In still further examples, the first face portion 32, 632 can have a variety of orientation angles relative to the central axis as well as the lugs 42, 642 having a variety of orientation angles.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A clinch nut for attachment to a plastically deformable metal substrate, said clinch nut comprising:
   a body portion with a central axis and a punch portion extending from said body portion and coaxial with said central axis, said body portion including an annular-shaped surface encircling the central punch portion, said annular-shaped surface including a plurality of spaced apart lugs encircling the central punch portion, one of the lugs including at least a contact surface with a recessed portion wherein the contact surface engages said metal substrate;
   a first portion of the contact surface being biased in a rotational direction about the central axis upon insertion in the metal substrate to form at least one lug flare during attachment of said nut to said metal substrate; and
   upon insertion in the metal substrate a portion of the metal substrate being entrapped between the at least one lug flare and the body portion, wherein the recessed portion has a larger width at a location radially closer to the punch portion than at a location radially further away from the punch portion.

2. The nut of claim 1, wherein the nut includes at least two lug flares that are located in a manner such that rotational movement of the nut about said central axis to remove the nut from the metal substrate is restricted.

3. The nut of claim 1, wherein one of the lugs includes at least two lug flares that are configured to form a dovetail connection with said metal substrate.

4. The nut of claim 1, wherein the contact surface of at least one of the lugs is sloped downwardly from an outer location to an inner location, downward being a direction away from the nut side of said metal substrate.

5. The nut of claim 1, wherein the annular-shaped surface of the body portion includes a plurality of first face portions that are located in between the plurality of the lugs; wherein the plurality of first face portions are sloped downwardly from an outer location to an inner location, downward being a direction away from the nut side of said metal substrate.

6. The nut of claim 1, wherein the body portion has an outer periphery that includes a plurality of third face portions about its periphery and wherein each lug is located in phase about a corresponding third face portion.

7. The nut of claim 1, wherein the body portion has an outer periphery that includes a plurality of third face portions about its periphery and wherein each lug is located out of phase such that each lug is located about two different third face portions.

8. The nut of claim 1, wherein the annular-shaped surface of the body portion includes a plurality of first face portions that are located in between the plurality of the lugs; wherein the plurality of first face portions include an outer wall that includes a top surface located at a height that is closer to a piercing edge of the punch portion than the location of the first face portions.

9. The nut of claim 1, wherein four of said lugs each having a contact surface are equally spaced about said central punch portion, each of said contact surface has a width extending in the rotational direction about said central axis, each of said contact surfaces includes said first surface portion and a second surface portion, said first and second surface portions extending in oppositely sloped directions with respect to said rotational direction.

10. The nut of claim 9, wherein said first and second surface portions are spaced in a width direction by said recessed portion.

* * * * *